US012063257B2

(12) United States Patent
Johnston et al.

(10) Patent No.: US 12,063,257 B2
(45) Date of Patent: *Aug. 13, 2024

(54) VIRTUAL COLLABORATION WITH MULTIPLE DEGREES OF AVAILABILITY

(71) Applicant: Cisco Technology, Inc., San Jose, CA (US)

(72) Inventors: Jay Kemper Johnston, Raleigh, NC (US); Magnus Mortensen, Cary, NC (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,231

(22) Filed: May 15, 2023

(65) Prior Publication Data

US 2023/0283646 A1 Sep. 7, 2023

Related U.S. Application Data

(63) Continuation of application No. 17/462,678, filed on Aug. 31, 2021, now Pat. No. 11,695,808.

(51) Int. Cl.
*H04L 65/1069* (2022.01)
*H04L 12/18* (2006.01)
(Continued)

(52) U.S. Cl.
CPC ...... *H04L 65/1069* (2013.01); *H04L 12/1818* (2013.01); *H04L 65/1073* (2013.01);
(Continued)

(58) Field of Classification Search
None
See application file for complete search history.

(56) References Cited

U.S. PATENT DOCUMENTS 7,633,744 B2 * 12/2009 Kuhn .................... G06F 1/1622
361/679.04
8,134,587 B2 * 3/2012 Niu ........................ H04N 7/148
348/14.09
(Continued)

OTHER PUBLICATIONS

Microsoft, "Microsoft Teams Meeting Quick Start Guide," Jun. 2021, 45 pages, available at: https://www.princegeorgescountymd.gov/documentcenter/view/36527/microsoft-teams-meetings-quick-start-guide-pdf.

*Primary Examiner* — Backhean Tiv
(74) *Attorney, Agent, or Firm* — Edell, Shapiro & Finnan, LLC

(57) ABSTRACT

A virtual collaboration system provides communication between a plurality of participants via a collaboration session that includes a corresponding plurality of participant devices. The collaboration session facilitates communication between the participant devices via a plurality of communication channels over which the participants communicate. For example, in some embodiments, the channels include one or more of a video channel, audio channel, or document sharing channel. A participant designates in which of the plurality of channels they will participate, and the designations are communicated to other participants. This provides a broader understanding of each participant's circumstances and ability to engage across the different channels with the plurality of participants.

20 Claims, 8 Drawing Sheets

(51) Int. Cl.
*H04L 65/1073* (2022.01)
*H04L 65/1096* (2022.01)
*H04L 65/401* (2022.01)
*H04L 65/403* (2022.01)

(52) U.S. Cl.
CPC ........ *H04L 65/1096* (2013.01); *H04L 65/401* (2022.05); *H04L 65/403* (2013.01)

(56) References Cited

U.S. PATENT DOCUMENTS

| | | | | |
|---|---|---|---|---|
| 8,209,181 B2 * | 6/2012 | Heckerman | ............ | G09B 19/00 725/87 |
| 8,855,285 B1 * | 10/2014 | Bracken | ............ | H04L 65/1104 379/202.01 |
| 8,887,067 B2 * | 11/2014 | Tripathi | ............ | H04L 51/04 715/756 |
| 8,924,243 B2 * | 12/2014 | Bentley | ............ | H04L 12/1818 705/7.19 |
| 8,970,661 B2 * | 3/2015 | Khan | ............ | H04L 12/1822 348/14.09 |
| 9,191,616 B2 * | 11/2015 | Krantz | ............ | H04N 7/142 |
| 9,282,286 B2 * | 3/2016 | Chauhan | ............ | H04N 7/147 |
| 9,344,469 B2 * | 5/2016 | Velagaleti | ............ | H04L 65/1069 |
| 9,398,059 B2 * | 7/2016 | Shepherd | ............ | H04L 12/1822 |
| 9,538,139 B2 * | 1/2017 | Whynot | ............ | H04N 7/152 |
| 9,661,269 B2 * | 5/2017 | Le Devehat | ............ | H04N 7/15 |
| 9,704,488 B2 * | 7/2017 | Kashtan | ............ | G10L 17/04 |
| 9,894,689 B2 * | 2/2018 | Ma | ............ | H04W 76/10 |
| 9,942,519 B1 * | 4/2018 | Pan | ............ | H04N 21/47 |
| 10,091,253 B2 * | 10/2018 | Sedar | ............ | H04L 65/401 |
| 10,389,769 B2 * | 8/2019 | Gudipaty | ............ | G06F 3/0482 |
| 10,547,654 B2 * | 1/2020 | Faulkner | ............ | H04L 12/1827 |
| 10,600,420 B2 * | 3/2020 | Faulkner | ............ | H04L 12/1822 |
| 10,630,843 B1 * | 4/2020 | Rosenberg | ............ | H04L 63/0428 |
| 10,757,148 B2 * | 8/2020 | Nelson | ............ | H04L 65/4015 |
| 10,810,553 B2 * | 10/2020 | Sexauer | ............ | H04L 12/1818 |
| 11,064,256 B1 * | 7/2021 | Voss | ............ | H04N 21/47 |
| 11,082,661 B1 * | 8/2021 | Pollefeys | ............ | H04N 7/15 |
| 11,144,885 B2 * | 10/2021 | Rosenberg | ............ | H04L 67/141 |
| 11,159,590 B1 * | 10/2021 | Sexauer | ............ | H04L 65/1069 |
| 11,196,869 B2 * | 12/2021 | Lee | ............ | H04M 3/564 |
| 11,323,278 B1 * | 5/2022 | Adlersberg | ............ | H04L 12/1831 |
| 11,381,613 B2 * | 7/2022 | Kimball | ............ | H04L 12/1813 |
| 11,394,925 B1 * | 7/2022 | Faulkner | ............ | H04N 7/147 |
| 11,463,499 B1 * | 10/2022 | Fieldman | ............ | H04L 65/403 |
| 11,695,808 B2 * | 7/2023 | Johnston | ............ | H04L 65/401 709/204 |
| 2006/0215630 A1 * | 9/2006 | Hwang | ............ | H04L 65/4038 370/351 |
| 2008/0065446 A1 * | 3/2008 | Haveliwala | ............ | G06F 9/454 705/7.12 |
| 2008/0133282 A1 * | 6/2008 | Landar | ............ | G06Q 10/109 705/5 |
| 2010/0275134 A1 * | 10/2010 | Baker | ............ | H04N 7/147 715/753 |
| 2011/0271210 A1 * | 11/2011 | Jones | ............ | H04L 67/306 715/753 |
| 2011/0271212 A1 * | 11/2011 | Jones | ............ | H04M 3/567 715/753 |
| 2013/0198629 A1 * | 8/2013 | Tandon | ............ | H04L 65/765 715/716 |
| 2013/0198654 A1 * | 8/2013 | Jones | ............ | H04L 65/403 715/753 |
| 2014/0019536 A1 * | 1/2014 | Christensen | ............ | G06Q 10/10 709/204 |
| 2015/0032809 A1 * | 1/2015 | Xie | ............ | H04L 65/1094 709/204 |
| 2017/0223066 A1 * | 8/2017 | Grevers, Jr. | ............ | H04L 65/1083 |
| 2017/0280098 A1 * | 9/2017 | Sethuraman | ............ | H04L 12/1827 |
| 2018/0152486 A1 | 5/2018 | Singh et al. | | |
| 2018/0196634 A1 | 7/2018 | Solovey et al. | | |
| 2019/0019067 A1 | 1/2019 | Dettori et al. | | |
| 2020/0112450 A1 * | 4/2020 | Chhabra | ............ | H04L 65/403 |
| 2022/0109707 A1 * | 4/2022 | Butterfield | ............ | G06Q 10/103 |
| 2022/0263675 A1 * | 8/2022 | Cupala | ............ | G06Q 10/103 |
| 2022/0360589 A1 * | 11/2022 | Muscariello | ............ | H04L 63/065 |
| 2023/0068117 A1 * | 3/2023 | Johnston | ............ | H04L 65/401 |
| 2023/0283646 A1 * | 9/2023 | Johnston | ............ | H04L 12/1818 709/204 |

* cited by examiner

VIRTUAL COLLABORATION WITH MULTIPLE DEGREES OF AVAILABILITY

CROSS-REFERENCE TO RELATED APPLICATION

This application is a continuation of and claims the benefit of priority to U.S. patent application Ser. No. 17/462,678, filed Aug. 31, 2021, and issued as U.S. Pat. No. 11,695,808, the entire contents of which are incorporated herein by reference.

TECHNICAL FIELD

This application relates to virtual/online collaboration systems.

BACKGROUND

The transition to remote work, especially during a time when "work time" and "home life time" overlap extensively, has brought on new challenges for people attending online meetings or, in other words, virtual collaboration. Employees are more frequently integrating their personal lives with their work lives. The result of this is that employees participate in virtual collaboration sessions from a variety of environments or contexts. Employees may be located in a home office, but alternatively may be rocking a sleeping baby, traveling on a train, or driving their children to school. Improving the operation of virtual collaboration environments is important for the success of the global economy going forward, especially given trends toward remote work. These trends are further exacerbated by an increasing need to reduce density of employees within office spaces.

DESCRIPTION OF EXAMPLE EMBODIMENTS

Overview

Figure 1:
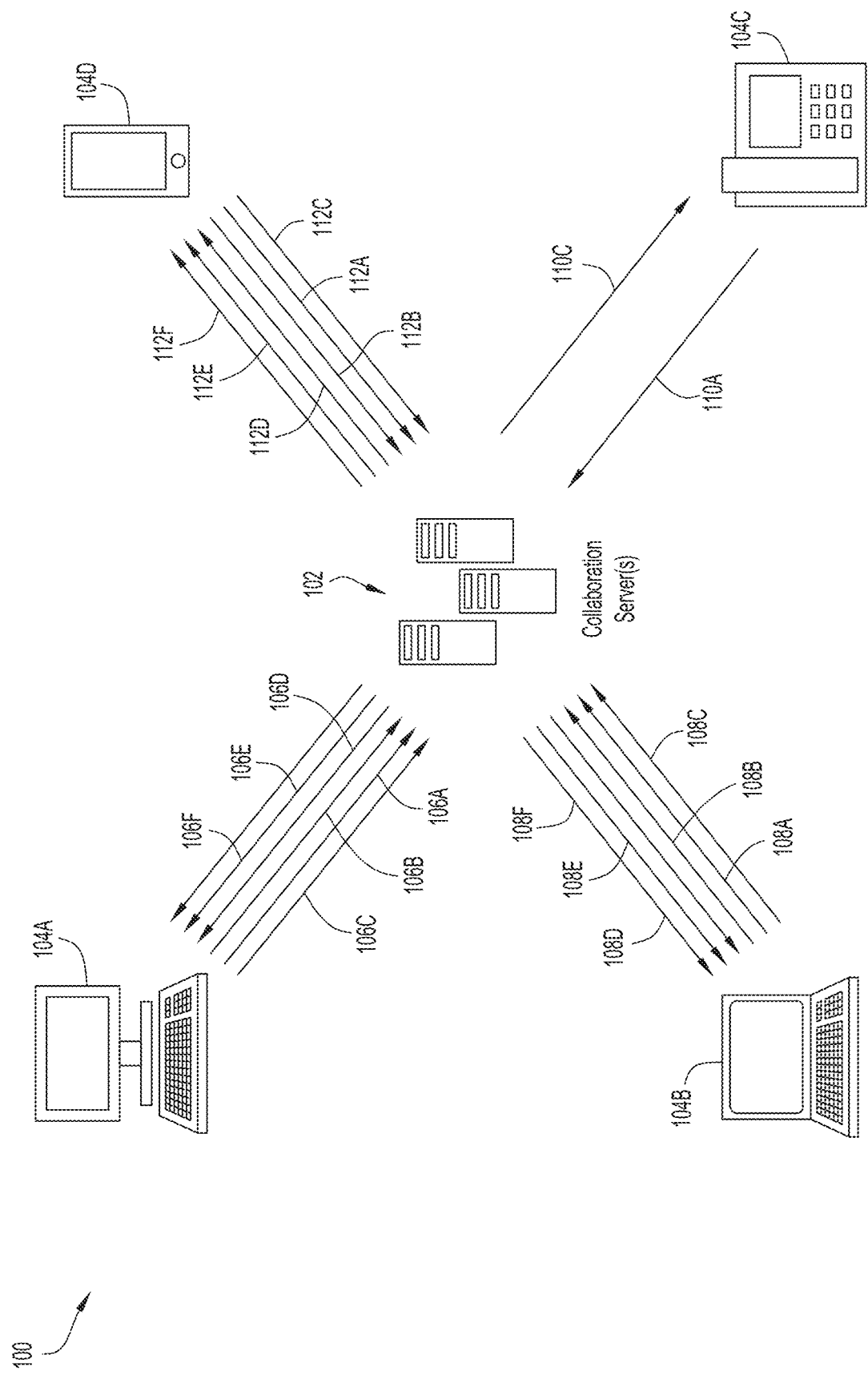
FIG. 1 is an overview diagram showing a collaboration system in accordance with an example embodiment.

A collaboration system provides an ability for participants of a collaboration session to indicate in which of a plurality of communication channels they will participate. In one form, a method includes scheduling or initiating a collaboration session with a plurality of participants, the collaboration session configured to share information with a corresponding plurality of participant devices via a plurality of channels. The method includes receiving, from a first participant device of the plurality of participant devices, an indication of participation, by a first participant associated with the first participant device, in each of the plurality of channels. The method further includes providing, to a second participant device of the plurality of participant devices, the indication of participation, by the first participant, in each of the plurality of channels, the second participant device associated with a second participant.

Example Embodiments

Embodiments are presented herein to communicate to participants of a virtual collaboration session how a particular participant will participate with respect to a plurality of channels of communication facilitated by the virtual collaboration session. A virtual collaboration session is an online or web-based collaboration session (e.g., meeting, conference, etc.) that is supported over one or more networks.

The disclosed embodiments recognize challenges associated with attending virtual collaboration sessions, which can occur at almost any time of the day and night. This results in a greying of the line between work time and personal time. In some circumstances, a participant is able to join a virtual collaboration session but, due to personal circumstances, is limited to only "listening in." For example, in some circumstances, the participant is located within a noisy environment, where verbally communicating during the collaboration session risks injecting a large amount of noise into the audio stream. Due to a concern that they might be asked to speak during the collaboration session, the participant instead may decide not to join the virtual collaboration session. Thus, the potential participant misses out on content provided during the virtual collaboration session. This could negatively affect their, and/or their teams, productivity.

As another example, Bob needs to join his manager's team meeting via his cell phone/ear buds to hear updates from the team, but he is also caring for his one-year-old child. The child is having a bad day and crying a lot. If Bob goes off-mute, the crying child might disrupt the meeting, thus, Bob decides not to join at all.

As a third example, Calbo needs to walk to pick up his child from school, and must walk down a busy street with substantial traffic. The noise from the road would prevent Calbo's audio from being captured clearly, but Calbo would be able to listen to the meeting as it progressed. However, there is no way to indicate this status to other participants.

In a fourth example, Reynaldo is on an airplane and wants to attend a meeting, but the batteries for his headphones are depleted. Reynaldo is unable to listen to the meeting on his speakerphone as doing so is against airline policy, but he would be able to watch a live demo being shown via video, especially since the collaboration system provides closed captioning of other participants audio inputs, allowing him to follow along and stay up-to-date with the discussion of the meeting. However, Reynaldo cannot risk be called upon to respond, as there is no way for him to do so, and thus does not attend the meeting.

As a final example, Jeremy is driving his car while dialed into a meeting. He can listen-in, and also talk back but he is unable to view any presentation as doing so would distract him from having his eyes on the road.

Thus, due to a variety of environmental factors, in many situations a participant of a meeting may not be able to fully engage in every communication channel that a virtual collaboration session provides, such as a bi-directional audio channel, a bi-directional video channel, or screen/content sharing. A participant is thus able to engage in only a subset of the communication channels. With current solutions, the collaboration host and/or active presenter, along with other participants, are unaware of any limitations a particular participant has on their ability to fully participate. Some solutions provide icons indicating when a participant is utilizing a video conferencing endpoint or attending a collaboration session via a cell phone—allowing participants to see the type of device they are connected to the session with. However, generally, indications of a participant's ability to participate in multiple communication channels is not provided. Some solutions remove background noise from audio, but unfortunately, removing background noise is of little assistance when a user simply cannot speak effectively in the collaboration session because of their environment. For example, if an attendee does not want to wake up a nearby sleeping baby, removing background noise from their audio does not solve that problem.

Because of the limitations in existing solutions, some potential participants choose instead not to attend a collaboration session that they otherwise would have attended, because they do not have an effective way to signal to others what capacity they have to participate in that session. Some participants fear potentially being called on when they cannot speak, or asked a question about the presentation which they could not see. This very real fear is limiting and prevents would-be participants from actually participating in the collaboration session to the extent that they can.

The disclosed embodiments take a step towards making a virtual collaboration experience better than in-person meetings in a large variety of situations. For example, participants may find themselves in a variety of circumstances, such as, the participant can observe video, and can listen to an audio channel, but is unable to speak. For example, if the participant is riding a very busy, and loud, train, their speaking abilities may be compromised, but they can observe the meeting via their mobile device, and can listen to an audio channel via wired or wireless headphones (e.g., pod type headphones or over the ear headphones).

In other circumstances, a participant is able to observe video, and can listen to an audio channel, and can also speak, but the quality of any speech generated by the participant is degraded. For example, if a participant is located in an environment that includes a sleeping individual, such as their spouse or a baby, the participant prefers to remain silent while participating in the meeting, but if absolutely necessary, would be able to communicate verbally. In some other circumstances, a participant is able to observe video, but is unable to participate in any audio channels, in that they cannot hear audio, nor are they able to contribute verbally. In some other circumstances, a participant is unable to observe video presentation of a collaboration session, but is able to hear audio of the collaboration and verbally communicate with other collaboration participants. For example, the participant may be in a vehicle listening to the collaboration session, and they are able to respond, but it would be potentially dangerous for the participant to watch a presentation video. In other circumstances, a participant is unable to share screen content or presentations. For example, a participant may be on a mobile device, or using an endpoint that does not have the presentation or otherwise cannot share their screen. Some embodiments provide a user interface control that allows the participant to indicate they are unable to share their screen content or presentations. An indication of same is then presented to other participants within a collaboration session.

To compensate for the challenges discussed above (among others), the disclosed embodiments provide a method for collaboration participants to advertise their ability to communicate via a plurality of different communication channels available in a collaboration session.

In some embodiments, a collaboration participant explicitly indicates (e.g., manually via a user interface) their ability to contribute or participate across a plurality of communication channels. Participation in this context includes either the generation of content (e.g. for an input channel) or consumption of content (e.g. for an output channel) over a particular channel. A participant indicates this ability, in some embodiments, in a response to the meeting invite (before the meeting or collaboration session begins), or when the participant joins the meeting or collaboration, or anytime during the collaboration when their ability to contribute/participate changes. In some embodiments, a participant selects a duration during which they are able or unable to participate in a communication channel or alternatively, participate in a degraded state. In some embodiments, the duration is set to be equivalent to an entire duration of the collaboration session. In some cases, if a participant indicates their ability to participate in at least one communication channel will be degraded for a finite period of time (e.g. five minutes), a host (or other participants) may choose to delay having the participant join the collaboration session until they are able to fully participate. The method may involve receiving an indication of a duration of time during which the indication of participation applies or may apply, and an indication of the duration of participation may be provided to another participant (via the other participant's device).

Some embodiments automatically detect, without human assistance, a participant's ability to contribute or participate. The automatically detected ability of a participant to participate is then communicated to other participants. For example, some embodiments detect a participant's communication ability based on environmental factors around the user. These include characteristics such as motion, background noise, or detection of particular visual environments As one example, some embodiments are configured to detect that a baby is crying in the background or that a persistent loud noise is occurring. Under these circumstances, some embodiments suggest to the participant that they accept a communication mode that disables audio input from the participant. Alternatively, instead of making a suggestion, some embodiments disable a participant's audio input channel without any human involvement.

Some embodiments detect when a participant, and the device they are using to participate in a collaboration session, is in motion (jogging, in a car, on a plane, etc.). Some embodiments then, without human involvement, disable an audio input channel of the participant and provide a visual notification of the participant's revised state to other collaboration participants. Some embodiments, based on detected motion, provide a visual notification that the participant is unable to observe any videos or presentations which may be shared during the collaboration session.

Some embodiments analyze an audio channel of the collaboration session and determine a primary language being spoken. In some of these embodiments, a comparison between the primary language and one or more languages of a participant is performed. In some embodiments, the one or more languages of the participant are obtained from a user profile of the participant, or alternatively, in some embodiments, via analysis of one or more audio streams generated by the participant (e.g., input audio channel data). Based on the comparing, if the detected primary language is not a language in which the collaboration session has a record of a participant speaking or being competent in, the collaboration system, in some embodiments, without human intervention, enables subtitling of the audio channel into a language of the participant that is determined to be a "native" language of the participant. Some embodiments disable a participant's input audio channel when a comparison of the primary language and one or more languages of which the participant is competent detects a mismatch between the detected primary language and the one or more languages.

Thus, some of the disclosed embodiments account for the varying abilities of different participants to contribute to a collaboration session, and indicate to other participants those varying abilities. A participant's ability to contribute can be modified during a collaboration session, as circumstances of the participants change.

FIG. 1 is an overview diagram illustrating a collaboration system 100 in accordance with an example embodiment. FIG. 1 illustrates a collaboration server 102 in communication with a plurality of participant devices, including a first participant device 104A, a second participant device 104B, a third participant device 104C, and a fourth participant device 104D. FIG. 1 also illustrates communication between each of the plurality of participant devices and the collaboration server 102 via a plurality of channels. Channels are defined, in some embodiments, based on a type of information carried by the channel and a direction in which the information is carried. Each of the channels carries information in a particular direction, e.g. either from the participant device to the collaboration server 102, or from the collaboration server 102 to the participant device. The term "channel" in this context is not intended to be limiting (or to refer to a specific/dedicated physical communication channel), and is instead meant to denote an indication of different types of information that flow between a participant device and the collaboration server 102, and a direction in which that information is flowing. The multiple channels referred to herein may be communicated over the physical communication channel (wired network paths, wireless network paths, etc.) A channel is indicated, in some embodiments, via an identifier, such as a predefined number, that is physically associated with data flowing over the channel (e.g. sharing a packet with said data).

In some embodiments, channels include input channels, which carry information from a participant device to the collaboration server 102, and output channels, which carry information from the collaboration server 102 to a participant device. Different types of information are carried on different types of channels. Thus, for example, various channels carry, in some embodiments, one or more of audio information, video information, chat information, or screen or content (e.g., document) sharing information. Thus, some embodiments allocate an input channel and an output channel for one or more of these different information types.

Thus, some embodiments include one or more of an audio input channel, audio output channel, video input channel, video output channel, document sharing input channel, screen sharing input channel, chat input channel, chat output channel, or other additional channels not included in this list. In some embodiments, an input channel and an output channel having an equivalent type of data are combined and considered a single channel (e.g. an audio channel, carrying audio data in two directions, a video channel, including video data flowing in two directions, a chat channel carrying chat data in two directions, etc.).

Example of such channels are shown in FIG. 1. For example, FIG. 1 illustrates six channels of communication between the first participant device 104A and the collaboration server 102. The six channels include three input channels, a video input channel 106A, an audio input channel 106B, and a document or screen sharing input channel 106C. The six channels also include three output channels, a video output channel 106D, an audio output channel 106E, and a document or screen sharing output channel 106F. FIG. 1 illustrates six channels of communication between the second participant device 104B and the collaboration server 102. The six channels include three input channels, a video input channel 108A, an audio input channel 108B, and a document or screen sharing input channel 108C. The six channels also include three output channels, a video output channel 108D, an audio output channel 108E, and a document or screen sharing output channel 108F. FIG. 1 illustrates two channels of communication between the third participant device 104C and the collaboration server 102. The two channels include an audio input channel 110A, and an audio output channel 110C. The third participant device 104C has only two channels because it is a desk telephone that does not support non-audio forms of communication. FIG. 1 illustrates six channels of communication between the fourth participant device 104D and the collaboration server 102. The six channels include three input channels, a video input channel 112A, an audio input channel 112B, and a document or screen sharing input channel 112C. The six channels also include three output channels, a video output channel 112D, an audio output channel 112E, and a document or screen sharing output channel 112F.

As discussed above, embodiments of the collaboration server 102 provide an ability to share participation information of a participant device (and/or an associated participant) with respect to each of the channels of communication between the participant device and the collaboration server 102 (e.g. which of the channels 108A-D is the participant and/or participant device engaged or otherwise participating). Participating in an input channel generally indicates a participant will generate data over that input channel and provide the data to the collaboration server 102. For example, participating in an audio input channel indicates the participant plans to speak or otherwise intentionally generate audio data. Participating in an output channel generally indicates a participant plans to consume data provided by the channel. Thus, for example, participating in a video output channel indicates the participant will make a best effort to view video provided by the channel, or at least that the video will physically display on the participant's device. Indicating that a participant will not participate in a video output channel indicates the participant is unable to view of otherwise unable to make a best effort to view video provided by the channel.

Thus, the first participant device 104A communicates to the collaboration server 102, whether or not the first participant device 104A is going to provide, or intends to provide, data over the video input channel 106A, the audio input channel 106B, or the document or screen sharing input channel 106C. The first participant device 104A also indicates, to the collaboration server 102, whether the participant and/or participant device will view or display data received over the video output channel 106D, whether the participant and/or participant device will play or listen to the audio output channel 106E, or view documents or screens shared over the document or screen sharing output channel 106F.

The collaboration server 102 then distributes this information to other participant devices and/or participants. For example, if the first participant device 104A has indicated it is not providing data to the audio input channel 106B, the collaboration server 102 indicates, on a user interface of the second participant device 104B, that the first participant device 104A has selected to not provide said audio signal. As another example, the first participant device 104A indicates, in some embodiments, that it is unable to share document information over the document or screen sharing input channel 106C). Some embodiments then display information to the second participant device 104B indicating that the first participant device 104A is unable to share document information. This information is indicated, in some embodiments, by an icon or other graphical indicator visually proximate to (e.g. within a predefined distance of) a representation of the first participant device 104A, or the first participant, on a user interface of the second participant device 104B. In some embodiments, the first participant device 104A indicates that they are unable to view documents or screen shares via the document or screen sharing output channel 106F. More details on how this information is displayed is provided in the examples of FIG. 5 and FIG. 6, discussed below.

Figure 2:
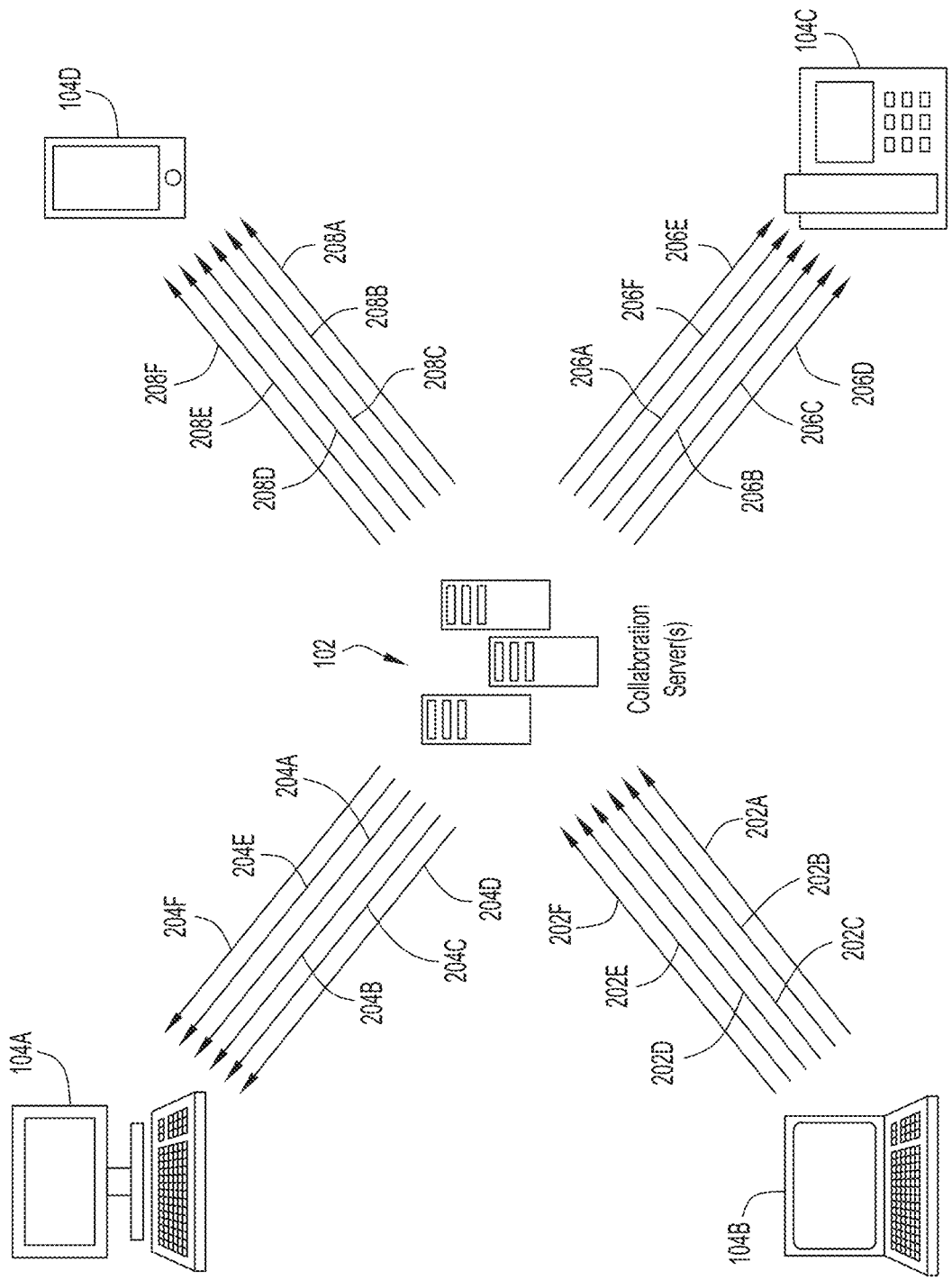
FIG. 2 is a diagram similar to FIG. 1, and showing channel participation information flowing from a participant device to other participant devices, in accordance with an example embodiment.

FIG. 2 is a diagram similar to FIG. 1, but showing channel participation information flowing from a participant device to other participant devices, in accordance with an example embodiment. FIG. 2 shows the collaboration server 102 of FIG. 1 either scheduling or actively hosting a collaboration session with the first participant device 104A, the second participant device 104B, the third participant device 104C, and the fourth participant device 104D. The second participant device 104B is shown communicating channel participation information to the collaboration server 102. For example, the second participant device 104B communicates a first channel participation indication 202A to the collaboration system. The first channel participation indication 202A indicates whether the second participant that has established a collaboration session with the collaboration server 102, via the second participant device 104B, will participate in a channel of the collaboration that corresponds to the first channel participation indication 202A. For example, the first channel participation indication 202A, indicates, in some embodiments, whether the second participant is able to speak, or otherwise generate an audio signal during the collaboration. Note that such an indication is distinguished from the second participant simply muting their microphone, which indicates, instead, that the second participant has paused generating/providing an audio signal, or disabled a device that generates the audio signal. Muting a microphone, and an indication of same, is different than the indication 202A, which, as discussed above conveys an intent of the participant to participate in an audio input channel during a defined duration of time. The duration of time includes, in some embodiments, an entirety of the collaboration session. In some other embodiments, the defined duration of time is less than the entire duration of the collaboration session, but is instead some finite time period (e.g., five minutes, ten minutes, etc.). The second participant device 104B also provides a second channel participation indication 202B, a third channel participation indication 202C, a fourth channel participation indication 202D, a fifth channel participation indication 202E, and a sixth channel participation indication 202F to the collaboration server 102. Each of these participant indications corresponds to a different communication channel, for example, an input channel or an output channel, in combination with one of video, audio, document or screen sharing, chat, or other channel of the collaboration session.

In response to receiving the channel participation information from the second participant device 104B, the collaboration server 102 selectively distributes the channel participation information of the second participant device 104B to the other participant devices participating in the collaboration session, including one or more of the first participant device 104A, third participant device 104C, and fourth participant device 104D. For example, the collaboration server 102 is shown distributing the first channel participation indication 202A as indication 204A to the first participant device 104A, as indication 206A to the third participant device 104C, and as indication 208A to the fourth participant device. Similarly, the second channel participation indication 202B is distributed, in some embodiments, as indication 204B to the first participant device 104A, as indication 206B to the third participant device 104C, and as indication 208B to the fourth participant device 104D. Similarly, the third channel participation indication 202C is distributed, in some embodiments, as indication 204C to the first participant device 104A, as indication 206C to the third participant device 104C, and as indication 208C to the fourth participant device 104D. Similarly, the fourth channel participation indication 202D is distributed, in some embodiments, as indication 204D to the first participant device 104A, as indication 206D to the third participant device 104C, and as indication 208D to the fourth participant device 104D. The fifth channel participation indication 202E is distributed, in some embodiments, as indication 204E to the first participant device 104A, as indication 206E to the third participant device 104C, and as indication 208E to the fourth participant device 104D. The sixth channel participation indication 202F is distributed, in some embodiments, as indication 204F to the first participant device 104A, as indication 206F to the third participant device 104C, and as indication 208F to the fourth participant device 104D.

In some embodiments, the indications provided to other participant devices, such as the indications 204A-F provided to the first participant device 104A, are used to provide visual indicators on a user interface that communicates, to (such as) a participant logged into the collaboration session via the first participant device 104A, a level of participation in each of the channels by (for example) the participant logged into the collaboration session via the second participant device 104B.

Figure 3:
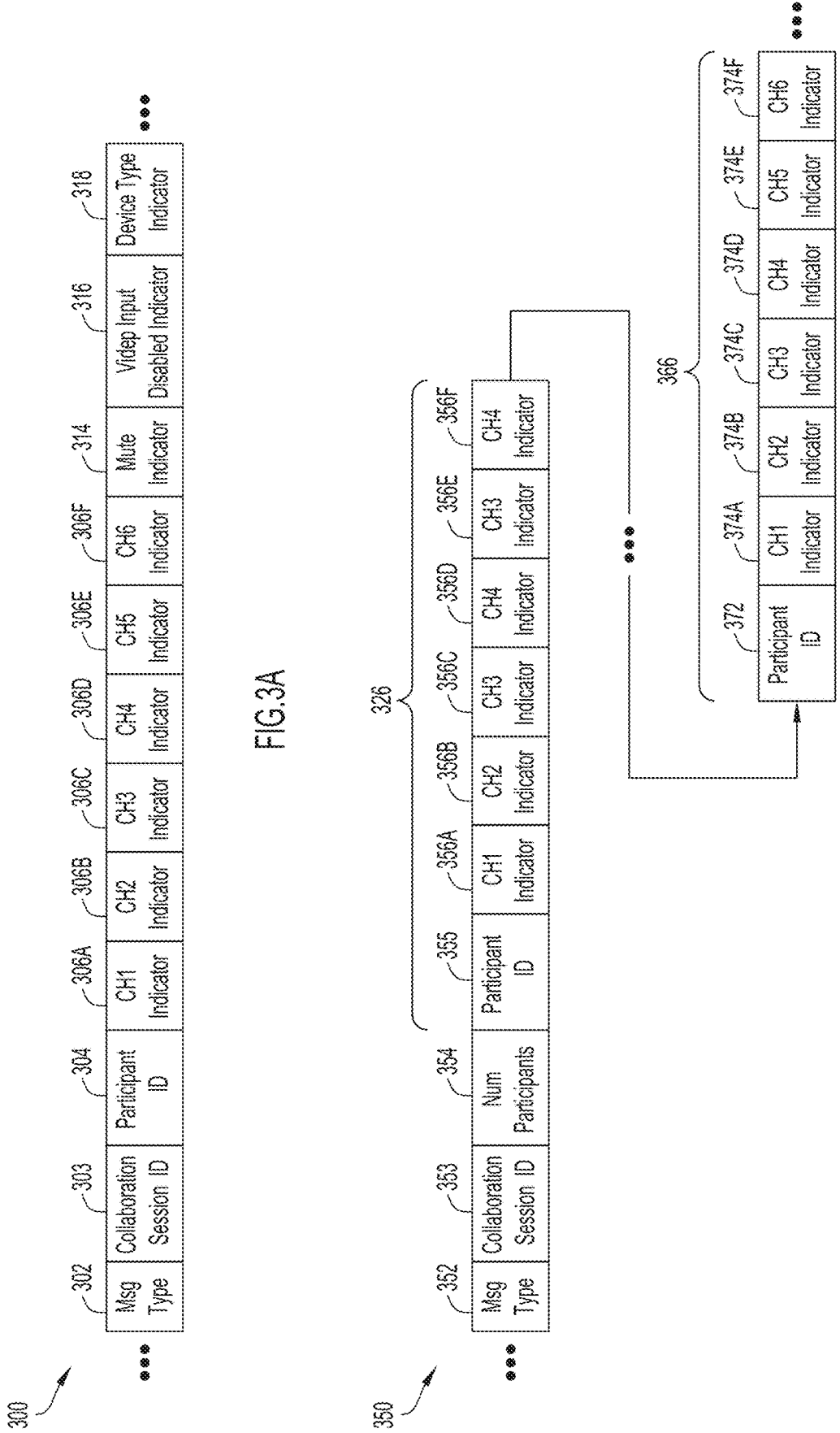
FIG. 3A shows a first message format in accordance with an example embodiment.
FIG. 3B shows a second message format in accordance with an example embodiment.

FIG. 3A illustrates a relevant portion of a message format in accordance with an example embodiment. FIG. 3A shows a first message format 300 of a message that communicates channel participation information from a participant device to a collaboration system. For example, the channel participation information 202A-F of FIG. 2 is indicated, in some embodiments, via one or more of the fields discussed below with respect to the first message format 300. The first message format 300 includes a message type field 302, a collaboration session identifier field 303, a participant identifier field 304, a first channel participation indicator 306A, second channel participation indicator 306B, a third channel participation indicator 306C, a fourth channel participation indicator 306D, a fifth channel participation indicator 306E, or a sixth channel participation indicator 306F, a mute indicator 314, a video input disabled indicator 316, and a device type indicator 318. While the first message format 300 illustrates the use of six channel participation indicators, other embodiments of the first message format 300 include zero or more channel participation indicators. For example, in some embodiments, a message includes no channel participation indicators and only a mode indicator, indicating a mode in which the device is operating. Example modes of participation are discussed below with respect to FIG. 4.

The message type field 302 identifies, via a predefined identifier, that a message including the message type field 302 has a format consistent with the first message format 300. The collaboration session identifier field 303 stores a value that uniquely identifies a particular collaboration session between a plurality of participant devices/participants. The participant identifier field 304 identifies a particular participant device/participant included in the collaboration session. Each of the channel indicators, such as the first channel participation indicator 306A, second channel participation indicator 306B, third channel participation indicator 306C, the fourth channel participation indicator 306D, the fifth channel participation indicator 306E, or the sixth channel participation indicator 306F, indicate whether the participant (identified by the participant identifier 304) intends or is otherwise able to participate in a channel of the collaboration session corresponding to the respective indicator. Thus, for example, any one or more of the channel participation indications 202A-F of FIG. 2 is indicated, in some embodiments, via the first channel participation indicator 306A, second channel participation indicator 306B, third channel participation indicator 306C, the fourth channel participation indicator 306D, the fifth channel participation indicator 306E, or the sixth channel participation indicator 306F, respectively.

The mute indicator 314 communicates whether the participant (identified via participant identifier field 304) has disabled their ability to generate an audio input signal (e.g. a traditional mute function). Note that FIG. 3A demonstrates a distinction between, for example, an indication of whether a collaboration participant is able or intends to speak or otherwise generate an audio signal during a collaboration session, and a separate indication of whether that participant has disabled their ability, e.g., via the participant device they are using to engage in the collaboration session, to generate an audio input signal. (e.g. "muted" their microphone). The video input disabled indicator 316 indicates whether the participant has at least temporarily disabled, via a user interface control of the collaboration session, their ability to generate a video input signal to the collaboration server 102 (e.g. to then be displayed to other collaboration participants/devices). Again, FIG. 3A demonstrates a distinction between an indication that a participant is able or intends to participate in providing a video input signal as part of attending the collaboration session, and the participant actively disabling generation of an input video signal during the collaboration session. The device type indicator 318 indicates a type of device the participant (identified by the participant identifier field 304) is using to engage in the collaboration session (identified by the collaboration session identifier field 303). While some embodiments derive indications of channels in which a participant will participate based on the device type indicator 318, the device type indicator 318 is separate and distinct from the channel participation indicators, such as any of the first channel participation indicator 306A, second channel participation indicator 306B, third channel participation indicator 306C, the fourth channel participation indicator 306D, a fifth channel participation indicator 306E, or a sixth channel participation indicator 306F. While the first message format 300 discussed above with respect to FIG. 3A illustrates the indication of one or more channel indications, (e.g. the first channel participation indicator 306A, etc.), some other embodiments in addition or alternatively to the channel indicators, communicate one or more indications of participation "modes" which generally indicate, in at least some embodiments, settings for multiple channels of communication between a collaboration system and a participant or participant device. Example modes of participation are discussed below with respect to FIG. 4. Thus, the techniques presented herein may involve establishing a communication session with a participant device, displaying via the communication session a user interface, and receiving input from the user interface such that the indication of participation is derived from the input received via the user interface.

A message containing information depicted by the first message format 300 is transmitted, in some embodiments, by a participant device to the collaboration server 102, in one or more of the following circumstances; when an invitation to a collaboration is acknowledged or accepted by the participant device, when a collaboration session is first initiated by the collaboration server 102, or at any time during a collaboration when a participant determines that their level of participation in one or more of the channels has changed.

FIG. 3B shows a second message format 350 in accordance with an example embodiment. The second message format 350 defines one embodiment of a network message transmitted by the collaboration server 102 to one or more participant devices. The network message communicates, to a first participant device/participant, participation across a plurality of channels of a collaboration session by other participant devices/participants. Thus, for example, the indications 206A-F are provided, in some embodiments, via a message in accordance with the second message format 350 to the third participant device 104C by the collaboration server 102. The second message format 350 provides for the communication of channel participation of a plurality of participants via a single message or at least a single message format. Thus, for example, via a message in accordance with the second message format 350, a participant device is provided with indications of participation by one or more other participant devices, across a plurality of channels of a collaboration session.

The second message format 350 includes a message type field 352, a collaboration session identifier field 353, and a number of participants field 354. The message type field 352 includes a predefined identifier that identifies a message as having the second message format 350. The collaboration session identifier field 353 identifies a collaboration session to which the message pertains. The number of participants field 354 identifies a number of participant records 326 included in the message having the second message format 350. The second message format 350 then includes one or more of the participant record 326 based on a value of the number of participants field 354 (e.g. one participant record for each participant). Each participant record includes a participant identifier field 355, first channel participation indicator 356A, second channel participation indicator 356B, third channel participation indicator 356C, a fourth channel participation indicator 356D, a fifth channel participation indicator 356E, and a sixth channel participation indicator 356F. The number of channel participation indicators varies by embodiment and by how many separate channels of participation are supported in a particular collaboration session. These fields then repeat in the second message format 350 based on the number of participants field 354. A last example participant record 366 is shown, and includes a participant identifier field 372, a first channel participation indicator 374A, second channel participation indicator 374B, third channel participation indicator 374C, a fourth channel participation indicator 374D, a fifth channel participation indicator 374E, and a sixth channel participation indicator 374F.

A message containing information depicted by the second message format 350 is transmitted by the collaboration server 102 to one or more participant devices, in some embodiments, when one or more of an invitation to the collaboration is accepted, denied or otherwise acknowledged by a collaboration participant, when a new participant joins a collaboration (and the message informs other devices of which channels the new participant will be participating in), or when a participant changes a level of participation in the collaboration session.

While the second message format 350 discussed above with respect to FIG. 3B illustrates the indication of one or more channel indications, (e.g. the first channel participation indicator 356A, etc.), some other embodiments of the second message format 350, in addition or alternative to the channel indicators, communicate one or more indications of participation "modes" which generally indicate, in at least some embodiments, settings for multiple channels of communication between a collaboration system and a participant or participant device. Example modes of participation are discussed below with respect to FIG. 4. Thus, for example, some embodiments of the second message format 350 include zero or more channel participation indicators and communicate one or more participation modes, with the participation modes defining the participation in each of the channels between the participant device and collaboration server(s).

Figure 4:
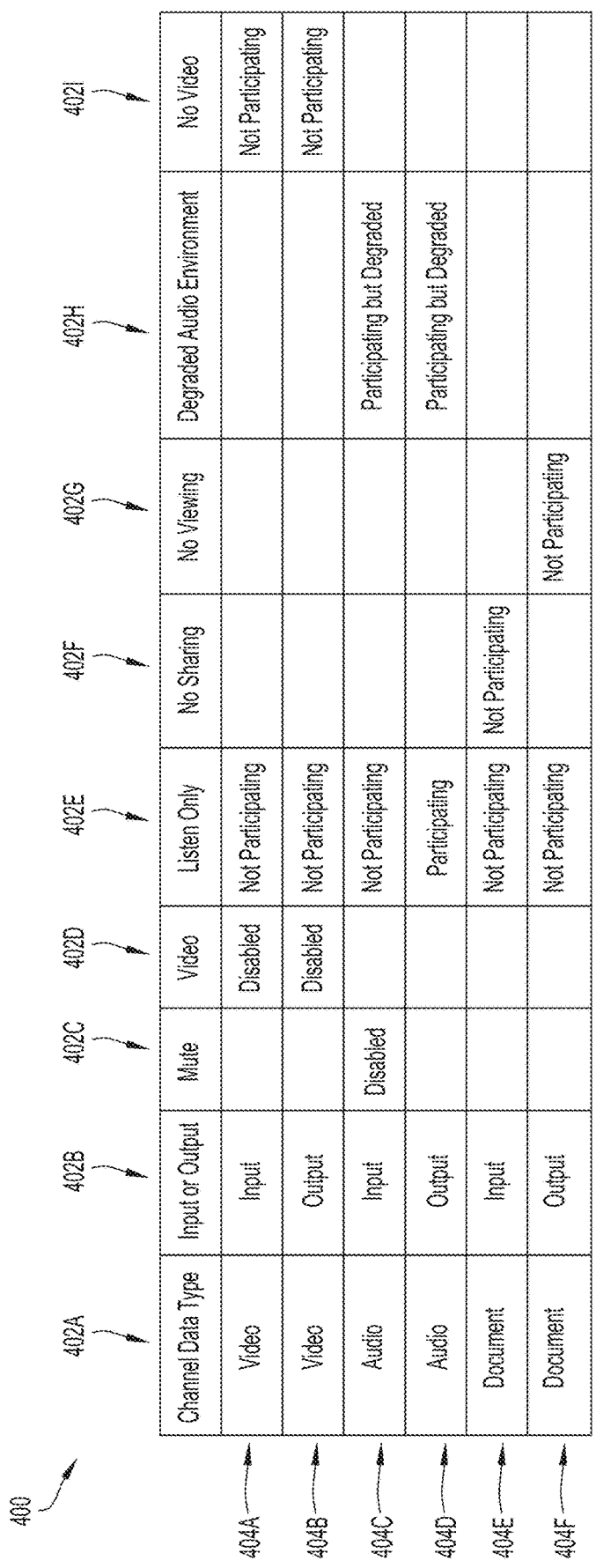
FIG. 4 is a table showing collaboration participation modes defined by combinations of channel participation settings in accordance with an example embodiment.

FIG. 4 is a table showing collaboration participation modes defined by combinations of channel participation settings in accordance with an example embodiment. The table 400 includes multiple columns including channel data type 402A, input or output indicator 402B, a mute mode 402C, a video disabled mode 402D, a listen only mode 402E, a no sharing mode 402F, a no viewing mode 402G, a degraded audio environment mode 402H, and a no video mode 402I. The modes identified in FIG. 4 are examples and the disclosed embodiments are not limited to the modes listed in FIG. 4. Furthermore, there is no requirement for any embodiment to support any of the modes listed in FIG. 4.

Table 400 also lists a plurality of channels, one or more of which are supported by some of the disclosed embodiments. These include a video input channel 404A (provided by a participant device to the collaboration server 102), video output channel 404B (provided to a participant device by the collaboration server 102), an audio input channel 404C (provided by a participant device to the collaboration server 102), an audio output channel 404D (provided to a participant device by the collaboration server 102), a document input channel 404E (e.g. a document sharing channel provided by a participant device sharing a document to the collaboration server 102), and a document output channel 404F (provided by the collaboration server 102 to a participant device to allow the participant device to view a shared document).

Cells of the table 400 indicate settings for particular channels in the given modes. The cells can indicate a plurality of different values. For example, a value of "not participating" indicates that the participant has indicated they will not be participating in the channel (either providing content or consuming content, depending on whether the channel is an input channel or an output channel) during a collaboration session. This value is, in some embodiments, updatable during the collaboration session by the participant, or automatically under some conditions and in certain embodiments.

A value of "disabled" indicates the participant has temporarily disabled their participation in the channel. "Disabled" differs from "not participating" in that disabled relates, generally, to a participant actively disabling a portion of hardware included in their participant device, such as a microphone or camera, such that no content is provide by the hardware. Not participating is a more general indication that the participant does not intend to provide any content (for input channels) or consume any content (for output channels) of the channel during the collaboration session, or for a given finite period of time (specified by the participant) during the collaboration session.

"Participating but degraded" indicates that the participant is participating in the channel, but expects a quality level of their participation is likely degraded relative to a nominal level. As "participating but degraded" can apply both to input channels or output channels, when applied to an output channel, participating but degraded indicates the participant may have difficulty understanding content provided over the channel.

If a cell in table 400 is blank, this indicates the mode does not define a participation level of the respective channel. Thus, table 400 defines, for example, that a mute mode 402C disables an audio input channel, and has no effect on any other channel (e.g. an empty cell in table 400 indicates the mode does not affect the given channel). The listen only mode 402E indicates that the collaboration participant is participating in the audio output channel 404D, but is not participating in any other of the channels listed in table 400. The video disabled mode 402D indicates that the participant's video input channel is disabled, but has no effect on any other channel. The no sharing mode 402F defines that the participant is not participating in a document input channel (e.g. the participant's device does not provide document information for sharing with other participants to the collaboration server 102), but does not define a status of other channels. The no viewing mode 402G defines that the participant is not participating in the document output channel 404F, but does not define a status of other channels. The degraded audio environment mode 402H indicates that both the audio input channel 404C and audio output channel 404D have a probability of experiencing degradation relative to nominal performance, but the participant is attempting to participate at least in those channels. The no video mode 402I indicates the participant is not participating in either the video input channel 404A or the video output channel 404B.

Figure 5:
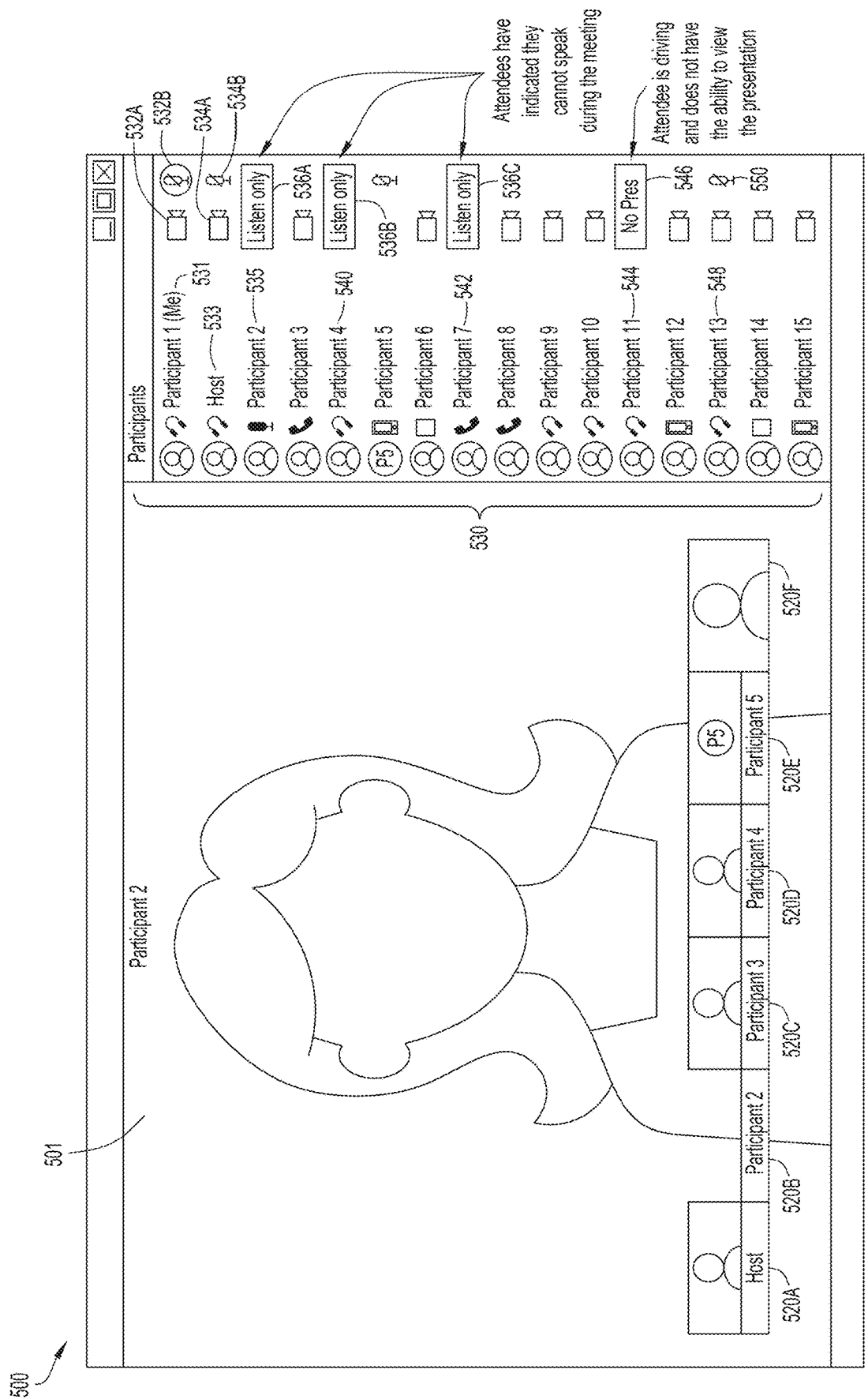
FIG. 5 is a user interface displaying channel participation information for a plurality of participants in accordance with an example embodiment.

FIG. 5 illustrates a user interface (screen) displaying channel participation information for a plurality of participants in accordance with an example embodiment. The user interface 500 is displayed on a participant device of a participant of a collaboration session. The user interface 500 is shown displaying a primary video feed 501 to the participant via the participant device. In some embodiments, the collaboration server 102 causes presentation of the user interface 500 on the participant device. Within the primary video feed 501, there is displayed or overlaid a number of different secondary video feeds of other participants participating in the collaboration session. These secondary video feeds are shown along the bottom of the user interface 500 as video feed 520A, video feed 520B (shown in a minimized view), video feed 520C, video feed 520D, video feed 520E, and video feed 520F. In some embodiments, the primary video feed 501 displays a participant that is currently speaking, and the secondary video feeds show participants not currently speaking.

Since the collaboration session illustrated in FIG. 5 includes a relatively large number of participants, all participant video feeds cannot be shown within the primary video feed 501. A participant list 530 is shown as a right pane of the user interface 500. The participant list 530 provides access to participants of the collaboration session, whether or not they are shown in a secondary feed. Various status icons are displayed proximate to a name of a participant within the participant list 530. The status icons indicate status of the participant's participation in one or more channels of the collaboration session. For example, a first participant 531 is shown with two icons, a first icon 532A and a second icon 532B. The first icon 532A indicates that the first participant 531 is providing video input data to the collaboration session. The second icon 532B indicates that the first participant 531 is providing audio input data to the collaboration session (e.g. the first participant 531 is not muted). A second participant 533 also is shown with two icons. A third icon 534A indicates, similar to the first icon 532A, that the second participant is providing a video input channel to the collaboration session. A fourth icon 534B indicates that the second participant 533 has temporarily disabled their audio input channel (e.g. the second participant is muted).

A third participant 535 is also shown within the participant list 530. An icon 536A indicates that the third participant 535 is in a "listen only" mode, such as the listen only mode 402E of FIG. 4. Similarly, a fourth participant 540 and fifth participant 542 are also in a "listen only" mode, as indicated by the icon 536B and icon 536C respectively. FIG. 5 shows a sixth participant 544 in a no viewing mode via an icon 546, analogous to the no viewing mode 402G discussed above with respect to FIG. 4. As noted in FIG. 5, the sixth participant 544 is driving and is thus not able to remain safe while driving and also view the presentation. A seventh participant 548 is shown muted via icon 550.

Thus, the user interface 500 of FIG. 5 demonstrates that some embodiments display, to a participant of a collaboration session, a participation mode of one or more other participants of the collaboration session. The participation mode corresponds, in some embodiments, to one or more of the participation modes discussed above with respect to FIG. 4 and the table 400. In some embodiments, such as the user interface 500, each mode expressed by a participant is communicated to the participant in the user interface 500 via a different icon.

Figure 6:
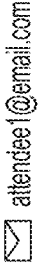
FIG. 6 is a user interface screen showing display of a meeting invitation acceptance that includes channel participation information, in accordance with an example embodiment.

FIG. 6 is a user interface displaying a collaboration invitation acceptance that includes channel participation information, in accordance with an example embodiment. The user interface 600 demonstrates that at least in some of the disclosed embodiments, a participation mode, or channels of a collaboration session in which a participant will be participating, are communicated to the collaboration server 102 in a response to an invitation to the collaboration session. Thus, FIG. 6 shows the user interface 600 is an acceptance of an invitation to a collaboration session. The user interface 600 includes a participation message 610, which indicates, that the participant will be attending the collaboration session in a "listen only" mode (e.g., analogous to the listen only mode 402E of FIG. 4). Various embodiments indicate any one of the participation modes identified in the table 400, or other modes, in a response to an invitation to a collaboration session. In some embodiments, the user interface 600 is displayed in response to receiving a message, from the participant, substantially in conformance with (or at least including one or more of the fields of) the first message format 300 discussed above with respect to FIG. 3A.

Figure 7:
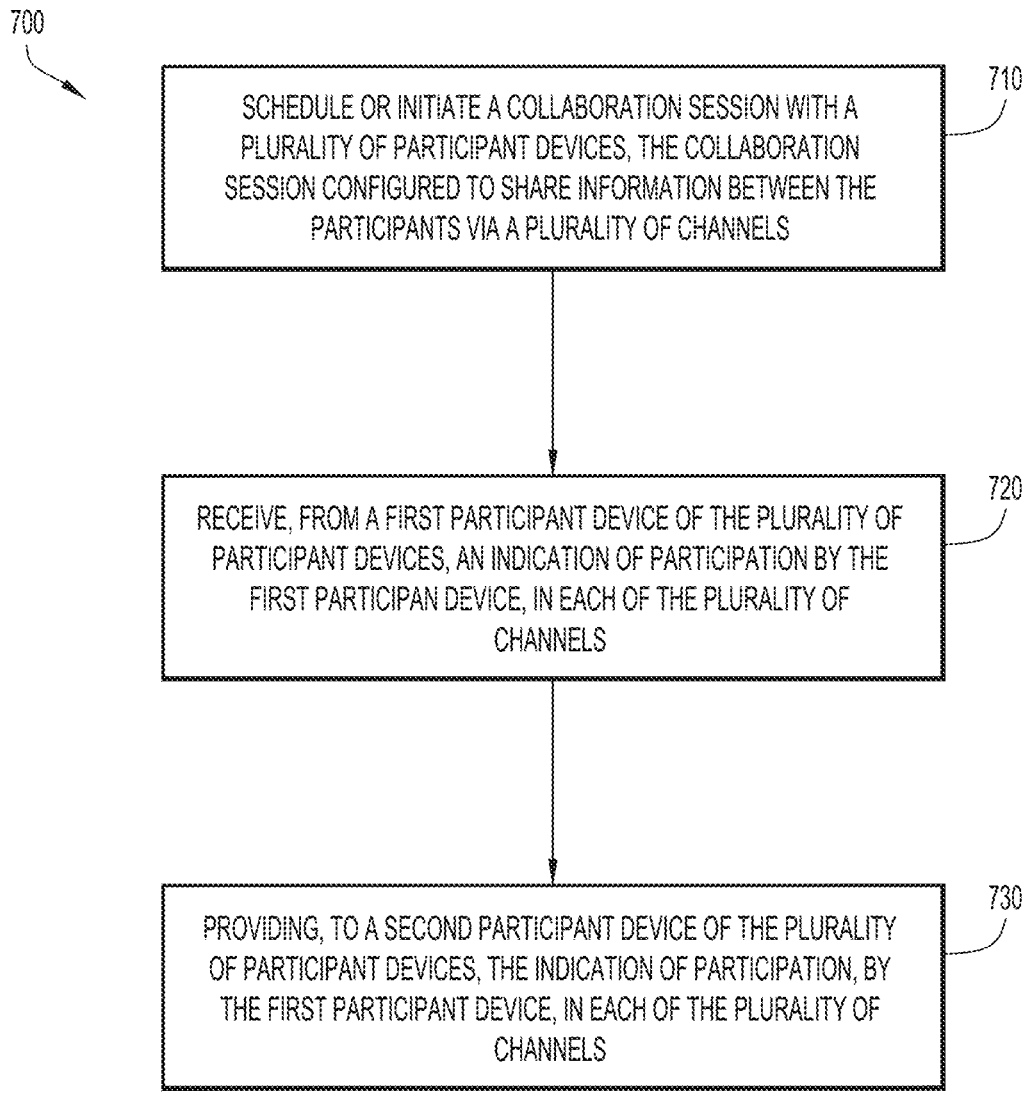
FIG. 7 is a flowchart of a method of communicating channel participation information in accordance with an example embodiment.

FIG. 7 is a flowchart of a method of communicating channel participation information in accordance with an example embodiment. In some embodiments, the method 700 is performed by the collaboration server 102. Generally, some embodiments of the method 700 provide for communication of participation indications to one or more participants of a collaboration session. Each participant indicates, in some embodiments, their intentions to participate in one or more communication channels of the collaboration session. These intentions are then communicated to other participants of the collaboration session. Thus, each participant receives an indication of other participants participation in each of a plurality of channels of communication supported by the collaboration session.

In operation 710, a collaboration session with a plurality of participants is scheduled or initiated. The collaboration session is configured to share information between the participants via a corresponding plurality of participant devices. Additionally, the collaboration session is configured to share information between the participant devices via a plurality of channels. The plurality of channels includes any of the example channels discussed above, such as a video input channel, video output channel, audio input channel, audio output channel, a document sharing channel, a document viewing channel, a chat input channel, or a chat output channel.

Scheduling a collaboration session includes, in some embodiments, sending invitations to the plurality of participant devices. The disclosed embodiments contemplate a variety of invitation forms, but some invitations include email messages addressed to email addresses of the potential participants. The invitations also, at least in some embodiments, specify a proposed date and time of the collaboration session.

Initiating a collaboration session includes, in some embodiments, establishing a communication session with each participant device of the plurality of participant devices. In some embodiments, establishing the communication session includes exchanging authentication information with each participant device to identify and/or validate the participant.

In operation 720, an indication of participation in each of the plurality of channels of the collaboration session is received from a first participant device of the plurality of participant devices. Thus, in some embodiments, a response to the invitation discussed above is received in operation 720, and the indication is included in the response. In some other embodiments, the indication is provided by the first participant device via a communication session established in operation 710. For example, some embodiments provide a user interface to a participant that allows the participant to indicate which channels the participant will be participating in, and/or allow the participate to select a mode of participation, e.g. analogous to the modes of participation discussed above with respect to FIG. 4.

In some embodiments, the indication of participation includes one or more of the fields discussed above with respect to the first message format 300 of FIG. 3A. In some embodiments, the indication of participation indicates one of the modes discussed above with respect to FIG. 4, such as the mute mode 402C, video disabled mode 402D, listen only mode 402E, no sharing mode 402F, no viewing mode 402G, degraded audio environment mode 402H, or the no video mode 402I.

Operation 730 provides or otherwise indicates, to a second participant device of the plurality of participant devices, the indication of participation, by the first participant device, in one or more of the plurality of channels. In some embodiments, operation 730 transmits or otherwise communicates a network message to the second participant device, with the network message indicating the indication of participation. For example, some embodiments of the network message include one or more fields of the second message format 350, discussed above with respect to FIG. 3B. In some embodiments, the network message indicates, for one or more of the participants of the collaboration session, one or more of the participation modes discussed above with respect to FIG. 4. Some embodiments of operation 730 cause a participant device to display a user interface analogous to the user interface 500. For example, some embodiments cause display of an icon within the user interface denoting participation of one or more participants in one or more of the plurality of channels. For example, in some embodiments, the user interface 500 is displayed as a web page in a browser application. In these embodiments, the collaboration server 102 provides data defining the user interface 500 to the participant device. The browser, running on the participant device, then displays the user interface 500 per the provided data. In other embodiments, the user interface 500 is displayed by an application running locally on the participant device. In these embodiments, the collaboration server 102 provides data (e.g. indications of participation of one or more participants, secondary video feeds, etc.) used by the local application to display the user interface 500.

Some embodiments of operation 730 display an indication of the first participant in a collaboration user interface that is displayable prior to a collaboration session being initiated. For example, some embodiments provide a user interface that allows a participant to a collaboration session to review invitation status of other participants. The invitation status indicates, in some embodiments, the indication of participation by each participant that has responded to the invitation to the collaboration session. Alternatively, some embodiments of operation 730 display a user interface analogous to the user interface 600 discussed above with respect to FIG. 6. As discussed above, the user interface 600 is displayed, in at least some embodiments, to a collaboration host upon receiving a response to an invitation to a collaboration session.

Some embodiments of method 700 detect a primary language of the collaboration session. For example, input audio channels provided by the participants in the collaboration session are analyzed by a natural language detection algorithm, in some embodiments, and perform spoken language identification (LID). An indication of participation of one or more participants is then determined based on the identified language type (e.g. English, Spanish, Mandarin, French, German, etc.). For example, some embodiments maintain profile information of each participant, with the profile information indicating one or more language types in which the participant is conversant and/or a native speaker. The detected language type is then evaluated against the profile language information to determine if it is likely the participant can: 1) understand the primary language, and/or 2) speak the primary language. Channels of participation are then set, in some embodiments, automatically or without human intervention, based on the evaluation. For example, if a participant is able to understand the primary language, some embodiments indicate that the participant will participate in an audio output channel of the collaboration session, otherwise, some of these embodiment indicate the participant will not participate in the audio output channel. If method 700 determines the participant is unable to speak the primary language, but is able to understand the primary language, some embodiments indicate the participant will participate in an audio output channel of the collaboration session, but will not participant in an audio input channel of the collaboration session.

Figure 8:
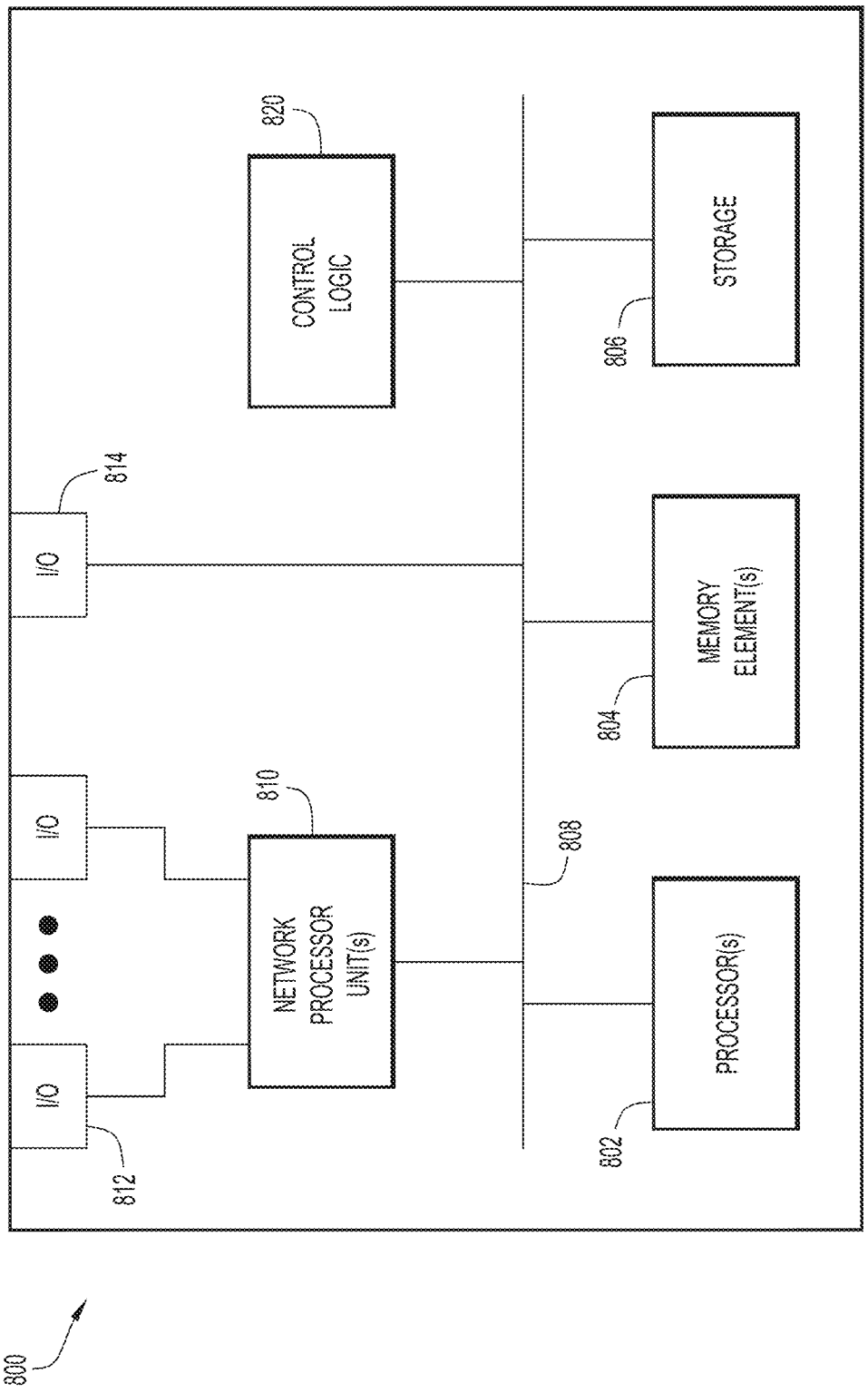
FIG. 8 is a hardware block diagram of a device that may perform functions associated with operations discussed herein in connection with the techniques depicted in any one or more of FIGS. 1-7.

FIG. 8 is a hardware block diagram of a device 800 that may perform functions associated with operations discussed herein in connection with the techniques depicted in any one or more of FIGS. 1-7. In various embodiments, any of the devices described above (e.g., a client device or a collaboration server) implement, in some embodiments, a computing architecture analogous to that described below with respect to the device 800.

In at least one embodiment, the device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for device 800 can overlap in any manner and are not limited to the specific allocation of instructions and/or operations described herein.

In at least one embodiment, processor(s) 802 is/are at least one hardware processor configured to execute various tasks, operations and/or functions for device 800 as described herein according to software and/or instructions configured for device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with device 800, and/or logic configured for memory element(s) 804 and/or storage 806. For example, any logic described herein (e.g., control logic 820) can, in various embodiments, be stored for device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of device 800 to communicate in order to exchange information and/or data. Bus 808 can be implemented with any architecture designed for passing control, data and/or information between processors, memory elements/storage, peripheral devices, and/or any other hardware and/or software components that may be configured for device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between device 800 and other systems, devices, or entities, via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 800 and other systems, devices, or entities to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to device 800. For example, I/O interface(s) 814 may provide a connection to external devices such as a display, keyboard, keypad, a touch screen, a camera, a microphone, and/or any other suitable input and/or output device now known or hereafter developed. This may be the case, in particular, when the device 800 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 800 serves as a user device as described herein.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), an IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as but not limited to electric, sound, light, infrared, qubits, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided that comprises scheduling or initiating a collaboration session with a plurality of participants, the collaboration session configured to share information with a corresponding plurality of participant devices via a plurality of channels, receiving, from a first participant device of the plurality of participant devices, an indication of participation, by a first participant associated with the first participant device, in each of the plurality of channels, and providing, to a second participant device of the plurality of participant devices, the indication of participation, by the first participant, in each of the plurality of channels, the second participant device associated with a second participant.

In another form, an apparatus is provided that comprises a network interface configured to enable network communications, one or more processors, and one or more memories storing instructions that when executed configure the one or more processors to perform operations comprising scheduling or initiating a collaboration session with a plurality of participants, the collaboration session configured to share information with a corresponding plurality of participant devices via a plurality of channels, receiving, from a first participant device of the plurality of participant devices, an indication of participation, by a first participant associated with the first participant device, in each of the plurality of channels, and providing, to a second participant device of the plurality of participant devices, the indication of participation, by the first participant, in each of the plurality of channels, the second participant device associated with a second participant.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

We claim:

1. A method comprising:
   receiving, from a first participant device of a plurality of participant devices for a collaboration session, an indication of participation for each of a plurality of output channels in which a first participant of the first participant device will or will not participate during the collaboration session, wherein each of the plurality of output channels is associated with content that the first participant can consume for the collaboration session; and
   based on receiving a first indication for a first output channel of the plurality of output channels indicating that the first participant will not participate in the first output channel, providing, to a second participant device of the plurality of participant devices, a first participation mode icon on a user interface of the second participant device associated with a second participant, the first participation mode icon indicating that the first participant is not consuming content for the first output channel during the collaboration session.

2. The method of claim 1, further comprising:
   based on receiving a second indication for a second output channel of the plurality of output channels indicating that the first participant will only consume content for the second output channel, providing, to the second participant device of the plurality of participant devices, a second participation mode icon on the user interface of the second participant device associated with the second participant, the second participation mode icon indicating that the first participant is only consuming content for the second output channel during the collaboration session.

3. The method of claim 2, wherein the second output channel of the plurality of output channels is an audio output channel and the second participation mode icon indicates that the first participant is only listening to audio during the collaboration session.

4. The method of claim 1, wherein the first output channel is a content viewing output channel and the first participation mode icon indicates that the first participant is unable to view content shared by any other participant during the collaboration session.

5. The method of claim 1, wherein the indication of participation is received in a response to an invitation to the collaboration session.

6. The method of claim 1, further comprising:
   receiving, from the first participant device, an indication of a duration of time during which the indication of participation applies; and
   providing an indication of the duration of time to the second participant device.

7. The method of claim 1, wherein the receiving includes determining an ability of the first participant to participate in a video output channel or a content viewing output channel of the plurality of output channels based on motion of the first participant being detected.

8. The method of claim 1, further comprising:
   establishing a communication session with the first participant device;
   displaying, via the communication session, a user interface; and
   receiving input from the user interface, wherein the indication of participation is derived from the input.

9. An apparatus, comprising:
   a network interface configured to enable network communications;
   one or more processors; and
   one or more memories storing instructions that when executed configure the one or more processors to perform operations comprising:
     receiving, from a first participant device of a plurality of participant devices for a collaboration session, an indication of participation for each of a plurality of output channels in which a first participant of the first participant device will or will not participate during the collaboration session, wherein each of the plurality of output channels is associated with content that the first participant can consume for the collaboration session; and
     based on receiving a first indication for a first output channel of the plurality of output channels indicating that the first participant will not participate in the first output channel, providing, to a second participant device of the plurality of participant devices, a first participation mode icon on a user interface of the second participant device associated with a second participant, the first participation mode icon indicating that the first participant is not consuming content for the first output channel during the collaboration session.

10. The apparatus of claim 9, the operations further comprising:
    based on receiving a second indication for a second output channel of the plurality of output channels indicating that the first participant will only consume content for the second output channel, providing, to the second participant device of the plurality of participant devices, a second participation mode icon on the user interface of the second participant device associated with the second participant, the second participation mode icon indicating that the first participant is only consuming content for the second output channel during the collaboration session.

11. The apparatus of claim 10, wherein the second output channel of the plurality of output channels is an audio output channel and the second participation mode icon indicates that the first participant is only listening to audio during the collaboration session.

12. The apparatus of claim 9, wherein the first output channel is a content viewing output channel and the first participation mode icon indicates that the first participant is unable to view content shared by any other participant during the collaboration session.

13. The apparatus of claim 9, the operations further comprising:
- receiving, from the first participant device, an indication of a duration of time during which the indication of participation applies; and
- providing an indication of the duration of time to the second participant device.

14. The apparatus of claim 9, the operations further comprising:
- establishing a communication session with the first participant device;
- displaying, via the communication session, a user interface; and
- receiving input from the user interface, wherein the indication of participation is derived from the input.

15. A non-transitory computer readable storage medium comprising instructions that when executed configure one or more processors to perform operations comprising:
- receiving, from a first participant device of a plurality of participant devices for a collaboration session, an indication of participation for each of a plurality of output channels in which a first participant of the first participant device will or will not participate during the collaboration session, wherein each of the plurality of output channels is associated with content that the first participant can consume for the collaboration session; and
- based on receiving a first indication for a first output channel of the plurality of output channels indicating that the first participant will not participate in the first output channel, providing, to a second participant device of the plurality of participant devices, a first participation mode icon on a user interface of the second participant device associated with a second participant, the first participation mode icon indicating that the first participant is not consuming content for the first output channel during the collaboration session.

16. The non-transitory computer readable storage medium of claim 15, the operations further comprising:
- based on receiving a second indication for a second output channel of the plurality of output channels indicating that the first participant will only consume content for the second output channel, providing, to the second participant device of the plurality of participant devices, a second participation mode icon on the user interface of the second participant device associated with the second participant, the second participation mode icon indicating that the first participant is only consuming content for the second output channel during the collaboration session.

17. The non-transitory computer readable storage medium of claim 16, wherein the second output channel of the plurality of output channels is an audio output channel and the second participation mode icon indicates that the first participant is only listening to audio during the collaboration session.

18. The non-transitory computer readable storage medium of claim 15, wherein the first output channel is a content viewing output channel and the first participation mode icon indicates that the first participant is unable to view content shared by any other participant during the collaboration session.

19. The non-transitory computer readable storage medium of claim 15, the operations further comprising:
- receiving, from the first participant device, an indication of a duration of time during which the indication of participation applies; and
- providing an indication of the duration of time to the second participant device.

20. The non-transitory computer readable storage medium of claim 15, the operations further comprising:
- establishing a communication session with the first participant device;
- displaying, via the communication session, a user interface; and
- receiving input from the user interface, wherein the indication of participation is derived from the input.

\* \* \* \* \*